United States Patent
Lemke et al.

(10) Patent No.: US 6,207,225 B1
(45) Date of Patent: *Mar. 27, 2001

(54) SOLVENTLESS TWO-COMPONENT STRIPPABLE LACQUER FOR METAL SURFACES

(75) Inventors: Horst Lemke, Ritterhude; Dieter Hohnholz, Oldenburg, both of (DE)

(73) Assignee: Relius Coatings GmbH & Co., Oldenburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,226

(22) PCT Filed: Mar. 25, 1997

(86) PCT No.: PCT/EP97/01514

§ 371 Date: Dec. 10, 1998

§ 102(e) Date: Dec. 10, 1998

(87) PCT Pub. No.: WO97/35932

PCT Pub. Date: Oct. 2, 1997

(30) Foreign Application Priority Data

Mar. 26, 1996 (DE) ............................................. 196 11 875

(51) Int. Cl.[7] ............................. B05D 1/00; B65B 33/00; C08G 18/08
(52) U.S. Cl. ............................ 427/156; 427/421; 528/53; 528/54; 528/58; 528/64; 528/66; 528/76
(58) Field of Search ..................................... 427/421, 156; 528/64, 66, 76, 53, 54, 58; 524/741, 730

(56) References Cited

U.S. PATENT DOCUMENTS

| | | |
|---|---|---|
| 3,544,400 | 12/1970 | Deutsch . |
| 3,661,840 | 5/1972 | Deutsch . |
| 4,134,814 * | 1/1979 | De Poortere et al. .......... 204/159.15 |
| 4,267,299 | 5/1981 | Oechsle, III . |
| 4,336,180 * | 6/1982 | Recker et al. ....................... 524/847 |
| 4,743,672 * | 5/1988 | Goel ....................................... 528/44 |
| 5,114,510 * | 5/1992 | Wright .................................. 156/82 |
| 5,204,439 * | 4/1993 | Dormish et al. ....................... 528/44 |
| 5,227,409 * | 7/1993 | Mobley et al. ....................... 521/167 |
| 5,654,085 * | 8/1997 | Markusch et al. ................... 428/221 |
| 5,731,397 * | 3/1998 | Primeaux, II et al. ................ 528/73 |

FOREIGN PATENT DOCUMENTS

| | | |
|---|---|---|
| 685700 | 2/1967 | (BE) . |
| 3739261 | 6/1989 | (DE) . |
| 4029809 | 3/1992 | (DE) . |
| 4039194 | 6/1992 | (DE) . |
| 4200172 | 7/1993 | (DE) . |
| 0239396 | 9/1987 | (EP) . |
| 0376674 | 7/1990 | (EP) . |

\* cited by examiner

*Primary Examiner*—Shrive Beck
*Assistant Examiner*—Jennifer Calcagni
(74) *Attorney, Agent, or Firm*—Fulbright & Jaworski, LLP

(57) ABSTRACT

A solvent-free, two-component strip coating for metal surfaces is described which comprises the following components:

A) 5 to 20% by weight of an optionally substituted aromatic diamine,
0.1 to 5% by weight of a dehydrator,
0.01 to 1% by weight of an accelerator based on tertiary amines,
0.01 to 1% by weight of an accelerator based on organic tin compounds, a polyether polyol based on poly(oxyalkylene) glycols as the remainder;

B) 40 to 60% by weight of an aromatic diisocyanate based on a phenylene or toluylene diisocyanate, 40 to 60% by weight of a polyether polyol based (poly(oxyalkeylene) glycols.

Despite its freedom from solvents, the strip coating according to the invention has rapid-hardening and rapid-drying properties, can be applied to a metal surface to be treated in a single spray operation and finally can be removed without problem and residue-free.

9 Claims, No Drawings

SOLVENTLESS TWO-COMPONENT STRIPPABLE LACQUER FOR METAL SURFACES

DESCRIPTION

Subject matter of the present invention is solvent-free, two-component strip coating for metal surfaces as well as a method for coating surfaces of metal parts, especially aluminium parts, with the aid of this strip coating.

In aeroplane construction, the surfaces of aluminium parts are partially treated with the aid of scouring baths for the purpose of weight reduction, whereby chemical removal of aluminium takes place. In order to prevent chemical attack on partial regions of the metal surfaces not to be removed, these are coated before the treatment with the scouring bath with a strip coating in spray or pour methods and therewith protected from the chemical treatment.

In this connection the demands on the strip coating are relatively high because it must be chemically resistant against acids and basis, must have rapid-hardening and drying properties in order to save time and expenditures and must possess a controlled adhesion so that it can be stripped without problem and residue-free after conclusion of the chemical metal removal.

As a rule, the coatings known up to now and used in practice have a relatively low binding agent content (ca. 30 to 35% by weight) and a comparatively high amount of organic solvents (ca. 65 to 70% by weight). Because these coatings must be rapid-drying, predominantly high-volatile and highly flammable solvents are used whose flash-point lies at least well below 21° C. and which can additionally be toxic (such as for example toluene). For ecological reasons, these solvents are no longer allowed to be disposed of in the surroundings requiring extensive regeneration or waste disposal of these solvents.

A further serious disadvantage of the strip coatings known to now is the fact that at least three spray operations with drying times of a total of more than 4 hours are required for the sufficient coating of the metal surfaces, whereby the method practised up to now is very time and cost intensive.

According to U.S. Pat. Nos. 3,661,840 or 3,544,400 two-component strip coatings of this type consist of, for example, HO- or HS-modified polybutadienes, polyisocyanates or diamines, large amounts of fillers and high-volatile solvents as well as phenol or epoxide resins for improving adhesion.

Therefore, the object of the present invention is to develop a strip coating for metal surfaces which does not have the mentioned disadvantages of the art, but instead, is solvent-free on the one hand and has good technical use properties with respect to chemical resistance as well as hardening and adhesion properties on the other hand.

The problem was solved according to the invention by a two-component strip coating with the components A) and B), whereby A) essentially contains the following constituents:

- 5 to 20% by weight of an optionally substituted aromatic diamine,
- 0.1 to 5 % by weight of a dehydrator,
- 0.01 to 1 % by weight of an accelerator based on tertiary amines,
- 0.01 to 1% by weight of an accelerator based on organic tin compounds, and a polyether polyol based on poly (oxyalkylene) glycols as the remainder;

and whereby B) essentially contains the following constituents:

- 40 to 60% by weight of an aromatic diisocyanate based on a phenylene or toluene dusocyanate,
- 40 to 60% by weight of a polyether polyol based poly (oxyalkylene) glycols.

That is to say it has been surprisingly shown that the strip coating according to the invention is, despite its freedom of solvents, rapid-hardening as well as rapid-drying, can be applied in a single spray operation to the metal surface to be handled and finally can be removed again without a problem and residue-free.

The strip coating corresponding to the present invention is comprised—as already mentioned—of the two components A) and B). The component A) contains at least five constituents, whereby the main constituent represents a polyether polyol based poly(oxyalkylene) glycols with up 94% by weight with respect to component A). In this connection, the customary poly(oxyalkylene) glycols based on ethylene and/or propylene oxide can be used as polyether polyols. According to a preferred embodiment, a trifunctional polyether polyol based on propylene oxide, ethylene oxide and trimethylolpropane is used whose molar weight lies in the range of 500 to 5000 g/mol and has ca. 80% primary and ca. 20% secondary hydroxyl groups.

As a second essential constituent, the component A) contains 5 to 20% by weight of an optionally substituted aromatic diamine which contributes to the chain elongation of the urethane prepolymer. In this connection, one can rely on the customary isomeric phenylenediamines. Preferably, methyl- or ethyl-substituted aromatic diamines also find use. In this connection, diethyltoluylenediamine is particularly preferably used which for example has an NH equivalent of ca. 89 to 130.

As a third constituent, the strip coating according to the invention contains 0.1 to 5% by weight of a dehydrator, whereby sodium or potassium aluminosilicates having a pore size of ca. 0.3 to 0.4 nm have particularly proven themselves. The hydrator ensures that the strip coating does not foam and is porous.

Additionally, it is to be seen as essential to the invention that the component A) further contains accelerators based on tertiary amines as well as on organic tin compounds each in an amount of 0.01 to 1% by weight because a very quick and sufficient hardening of the coating is only ensured in this manner. In this connection, customary accelerators can be used. Preferably, sterically hindered bicyclic compounds such as for example 1, 4-diazabicyclo[2.2.2]octane or 2-methyl-2-azanorbornane are used as tertiary amines. In the accelerators based on organic tin compounds, the use of alkyl tin mercaptides, such as for example dimethyltin mercaptide, is to be seen as preferred. According to a preferred embodiment, the strip coating according to the invention can further contain 0.01 to 1% by weight of an alkoxysilane with which the adhesion properties of the coating can be purposively controlled. In this connection, the alkoxysilane can have alkoxy groups with 1 to 4 C-atoms as well as, optionally, glycidoxyalkyl residues with 1 to 4 C-atoms.

In addition, the possibility exists within the frame of the present invention to further add 0.1 to 1.0% by weight of a alkali- and acid-stable pigment or dye so that the strip coating is easier to optically recognize during processing. In this connection, monoazo dyes or pigments have proven themselves as particularly advantageous.

According to a preferred embodiment, component A) further contains 1 to 20% by weight of micronized magnesium silicate (talcum) with a particle size of ca. 5 μm, whereby an improvement of the mechanical (tearpropagation) and chemical properties (acid-stability) of the strip coating can be obtained.

The component B), which can be seen as a PU hardening component, comprises two constituents namely 40 to 60% by weight (with respect to component B) of an aromatic diisocyanate based on a phenylene or toluylene diisocyanate as well as 40 to 60% by weight of a poyletherpolyol based on poly(oxyalkylene) glycols which can preferably be identical to the polyether polyols described in component A). Examples for suitable aromatic polyisocyanates are 1,3- or 1,4-phenylene diisocyanates and/or 2,4- or 2,6-toluylene diisocyanate (TDI). However, 4,4'-diphenylmethane diisocyanate (MDI) is to be seen as particularly preferred because this isocyanate permits a sufficiently rapid-hardening reaction. Both constituents of component B), namely aromatic diisocyanate and polyether polyol, are reacted to a prepolymer with an NCO content of ca. 10 to 20%.

The weight ratio of component A) to component B) can be varied in broad limits, however, a weight ratio of component A) to component B) of 3:1 to 1:1 has proven itself as particularly advantageous.

The strip coating according to the invention can be used with great success in the surface coating of metal parts, especially of aluminium parts, whereby use can be made of the customary atomization, spray and pore devices suitable for two components which normally work at temperatures between +10 to +40° C. The atomization of the material can occur without air as well as with air atomization.

An important advantage of the strip coating according to the invention consists in the fact that it can be applied to horizontal or round as well as vertical surfaces. As a result of the rapid-hardening reaction of the coating according to the invention (working life: 3 to 120 seconds), the coating binds shortly after impact on the metal substrate such that this material no longer runs from vertical surfaces and curvatures. In this manner, an elastic and chemically resistant coating ensues with layer thicknesses of 0.1 to 10 mm. The facts that only one spray process is required and the drying time maximally amounts to 30 minutes from which a clear time and cost saving results for the production of the coating is to be emphasized as particularly advantageous.

After this drying time, polyurethane elastomer can be cut with a laser without problem and is resistant against the alkaline medium of the scouring baths.

A particular advantage in cutting the strip coating with a laser lies in the fact that the elastomer dissolves by heat and is for the most part removed from the ca. 300 $\mu$m wide cutting channel. The remaining ca. 30 $\mu$m thick melt solidifies after cooling. This melt residue seals the laser cut and is resistant against sodium hydroxide solution. Simultaneously, a predetermined breaking point is produced thereby. Hence, partial regions of the strip coating can be removed after each other whereby differential milling levels can be produced thereby.

Subsequent to the chemical metal removal, the strip coating according to the invention can be removed without problem and residue-free from the metal surface. In this manner blowing out thermal decomposition residues from the cutting channel as well as an additional sealing of the laser cut can be omitted for example.

As a result of these particular technical use properties as well as the fact that one can work solvent-free (whereby cost intensive facilities for regeneration or waste disposal of organic solvents can be avoided), the strip coating according to the invention is suitable in an excellent manner for technical use.

EXAMPLES

For the coating of aluminium parts which should be treated with alkaline scouring baths for the purpose of reducing the weight of partial surfaces that are statistically less strained, the aluminium surface was subjected to an alkaline and acid pre-treatment in order to remove oxides and impurities. A strip coating with the following formulation was applied to the surface pre-treated in this manner:

Formulation 1

Component A:

| | |
|---|---|
| 81.00 parts per weight | trifunctional polyether alcohol based on propylene oxide, ethylene oxide and trimethylolpropane, molar weight: 4800, ca. 80% primary and ca. 20% hydroxyl groups |
| 16.00 parts per weight | diethyltoluylene diamine with an NH equivalent of 130, |
| 2.00 parts per weight | potassium-, sodium aluminium silicate with a pore size of 3–4 Å, |
| 0.60 parts per weight | 1,4-diazabicyclo[2.2.2]octane |
| 0.60 parts per weight | dimethyltin mercaptide (in polyether polyol) |
| 0.60 parts per weight | 2-methyl-2-azanorbornane |
| 0.30 parts per weight | tinting paste yellow comprising 20 weight % monoazo dye based on acetyl acetic anilide (Hansa brilliant yellow 2GX 70 from the Firm Hoechst) |
| 0.10 parts per weight | alkoxysiliane (3-glycidoxypropyl-trimethoxysilane) |

Component B:

| | |
|---|---|
| 50 parts per weight | 4,4-diphenylmethane diisocyanate |
| 50 parts per weight | trifunctional polyether alcohol (as given in component A) |

Both constituents of component B are reacted to a prepolymer with an NCO content of ca. 15%. The weight ratio of component A to component B amounts to 2:1 weight per parts.

Formulation 2:

Component A:

| | |
|---|---|
| 71.00 parts per weight | trifunctional polyether alcohol based on propylene oxide, ethylene oxide and trimethylolpropane, molar weight: 4800, ca. 80% primary and ca. 20% secondary hydroxyl groups |
| 8.00 parts per weight | diethyltoluylene diamine with an NH equivalent of 89, |
| 4.00 parts per weight | potassium-, sodium aluminium silicate with a pore size of 3–4 Å, |
| 0.60 parts per weight | 1,4-diazabicyclo[2.2.2]octane |
| 0.40 parts per weight | dimethyltin mercaptide (in polyether polyol) |
| 0.60 parts per weight | 2-methyl-2-azanorbornane |
| 0.30 parts per weight | tinting paste yellow comprising 20 weight % monoazo dye based on acetyl acetic anilide (Hansa brilliant yellow 2GX 70 from the Firm Hoechst) |
| 0.08 parts per weight | alkoxysiliane (3-glycidoxypropyl-trimethoxysilane) |
| 15.02 parts per weight | micronized magnesium silicate (talcum) |

Component B:

| | |
|---|---|
| 50 parts per weight | 4,4-diphenylmethane diisocyanate |
| 50 parts per weight | trifunctional polyether alcohol (as given in component A) |

The two constituents of component B are reacted to a prepolymer with an NCO content of ca. 15%. The weight ratio of component A to component B amounts to 100:46.4 parts per weight.

The application of the strip coating occurs with the spray method with the aid of a commercially available two-component spray facility (ECONO-MIX D from the Firm Hilger and Kern) in a low pressure method or high pressure method (2-K-M-Powermix from the Firm Hilger and Kern) at a surrounding temperature of ca. 20 to 25° C. and a humidity of max. 85%. For better processability, components A and B are heated to ca. 40° C., whereby the viscosity is correspondingly reduced. As a result of the short working time of 6 to 8 seconds at 40° C., it is necessary that the components are separately led to the spray gun so that the mixing of the components first occurs in the mixing tube. As a result of the high reactivity of the reaction components, the coated metal parts are already non-slipping after 3 minutes. The hardening occurs at room temperature within 30 minutes. The layer thickness of the applied strip coating amounts to about 300 µm, whereby this layer ensures freedom from pores as well as laser cutability. After a time period of 30 minutes with respect to the material application, the polyurethane elastomer is easily cutable with a laser and stable against a 15% NaOH solution at 80° C.

The laser output is adjusted such that the elastomer liquefies and is pressed out up to 20 to 30 µm from the 300 µm wide cutting channel by means of an air stream. The material remaining in the cut is stable against sodium hydroxide solution. Such a laser cut forms a predetermined breaking point. Differently thick material removal can be obtained in the scouring baths by subsequent stripping of different geometries.

After the chemical removal, the coating according to the invention can be easily demasked by hand from the aluminium surfaces to be protected.

What is claimed is:

1. A method for the surface coating of metal parts comprising applying a solvent-free, two-component, controlled adhesion strippable coating for metal surfaces comprising components A and B wherein component A comprises from 5 to 20% by weight of an optionally substituted aromatic diamine;

from 0.1 to 5% by weight of a dehydrator;

from 0.01 to 1% by weight of an accelerator based on tertiary amines;

from 0.01 to 1% by weight of an accelerator based on organic tin compounds; and a polyether polyol based on poly(oxyalkylene) glycols, and wherein component B comprises from 40 to 60% by weight of an aromatic diisocyanate based on a phenylene or toluylene diisocyanate, and from 40 to 60% by weight of a polyether polyol based poly(oxyalkylene)glycol to a metal surface to be protected; wherein the curing time is less than 30 minutes and the curing temperature is between 10 and 40° C.

2. The method of claim 1, wherein the coating is applied to a thickness of from 0.1 to 10 mm.

3. The method of claim 1, wherein the coating is applied in a single spray operation.

4. The method of claim 1, wherein the coating is residue-free upon when removed from the metal surface.

5. A solvent-free, two-component coating for metal surfaces comprising components A and B wherein component A comprises from 5 to 20% by weight of an optionally substituted aromatic diamine;

from 0.1 to 5% by weight of a dehydrator;

from 0.01 to 1% by weight of an accelerator based on tertiary amines;

from 0.01 to 1% by weight of an accelerator based on organic tin compounds; and a polyether polyol based on poly(oxyalkylene) glycols;

and wherein component B comprises from 40 to 60% by weight of an aromatic diisocyanate based on a phenylene or toluylene diisocyanate, and from 40 to 60% by weight of a polyether polyol based poly(oxyalkylene) glycols;

wherein said coating provides controlled adhesion when applied to a metal surface such that is strippable from the metal surface to which it is applied; wherein the curing time is less than 30 minutes and the curing temperature is between 10 and 40° C.

6. The coating of claim 5, wherein the coating is residue-free when removed from the metal surface.

7. The solvent-free, two-component coating of claim 5 wherein component A further comprises 1 to 20% by weight micronized magnesium silicate having a particle size of about 5 microns.

8. A method for the surface coating of metal parts comprising applying a solvent-free, two-component, controlled adhesion strippable coating for metal surfaces consisting essentially of components A and B wherein component A consists essentially of from 5 to 20% by weight of an optionally substituted aromatic diamine;

from 0.1 to 5% by weight of a dehydrator;

from 0.01 to 1% by weight of an accelerator based on tertiary amines;

from 0.01 to 1% by weight of an accelerator based on organic tin compounds; and a polyether polyol based on poly(oxyalkylene) glycols, and wherein component B consists essentially of from 40 to 60% by weight of an aromatic diisocyanate based on a phenylene or toluylene diisocyanate, and from 40 to 60% by weight of a polyether polyol based poly(oxyalkylene)glycol to a metal surface to be protected.

9. A solvent-free, two component coating for metal surfaces consisting essentially of components A and B wherein component A consists essentially of from 5 to 20% by weight of an optionally substituted aromatic diamine;

from 0.1 to 5% by weight of a dehydrator;

from 0.01 to 1% by weight of an accelerator based on tertiary amines;

from 0.01 to 1% by weight of an accelerator based on organic tin compounds; and a polyether polyol based on poly(oxyakylene) glycols;

and wherein component B consists essentially of from 40 to 60% by weight of an aromatic diisocyanate based on a phenylene or toluylene diisocyanate, and from 40 to 60% by weight of a polyether polyol based poly(oxyalkylene) glycols;

wherein said coating provides controlled adhesion when applied to a metal surface such that is strippable from the metal surface to which it is applied.

* * * * *